US012190345B1

(12) United States Patent
Shah et al.

(10) Patent No.: US 12,190,345 B1
(45) Date of Patent: Jan. 7, 2025

(54) SYSTEMS AND METHODS OF ENCODING BNPL TRANSACTIONS FOR TERMINAL DEVICES

(71) Applicant: MASTERCARD INTERNATIONAL INCORPORATED, Purchase, NY (US)

(72) Inventors: Mehulkumar Shah, Edison, NJ (US); Pradeep Agrawal, Ahmedabad (IN); Abhinav Naresh Saini, Navi Mumbai (IN); Jaimin Limbani, Rajkot (IN); Pranav Gupta, Mr10 sukhliya (IN); Rakesh Kumar, Stamford, CT (US)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 0 days.

(21) Appl. No.: 18/463,448

(22) Filed: Sep. 8, 2023

(51) Int. Cl.
| | | |
|---|---|---|
| *G06Q 30/02* | (2023.01) | |
| *G06Q 20/20* | (2012.01) | |
| *G06Q 20/24* | (2012.01) | |
| *G06Q 20/34* | (2012.01) | |
| *G06Q 30/0238* | (2023.01) | |
| *G06K 7/14* | (2006.01) | |

(52) U.S. Cl.
CPC ....... *G06Q 30/0238* (2013.01); *G06Q 20/202* (2013.01); *G06Q 20/208* (2013.01); *G06Q 20/24* (2013.01); *G06Q 20/351* (2013.01); *G06K 7/1417* (2013.01)

(58) Field of Classification Search
CPC ............. G06Q 30/0238; G06Q 20/202; G06Q 20/208; G06Q 20/24; G06Q 20/351; G06Q 30/0207–30/0277; G06K 7/1417
See application file for complete search history.

(56) References Cited

U.S. PATENT DOCUMENTS

| | | | | |
|---|---|---|---|---|
| 8,121,922 | B2 * | 2/2012 | Walker | G07G 5/00 |
| | | | | 705/38 |
| 11,748,759 | B1 * | 9/2023 | Sardari | G06Q 30/0631 |
| | | | | 705/44 |
| 11,907,918 | B2 * | 2/2024 | Leger | G06Q 20/085 |
| 11,922,495 | B1 * | 3/2024 | Hernandez | G06Q 20/4016 |

(Continued)

*Primary Examiner* — Thuy N Nguyen
(74) *Attorney, Agent, or Firm* — Pillsbury Winthrop Shaw Pittman LLP

(57) ABSTRACT

Systems, methods, and computer readable media may facilitate buy-now-pay-later (BNPL) transactions at brick-and-mortar locations of merchants that otherwise lack an ability to interface with financial institutions (FIs) that finance BNPL transactions. Likewise, the system may be used to conduct BNPL transactions for merchants that lack an electronic commerce presence. For example, a payment network used to process payment cards such as credit cards may be leveraged to communicate with user devices, merchant point of sale (POS) terminals, and BNPL servers operated by FIs to mediate BNPL transactions. In particular, the payment network may receive, from merchants, a list of items that are eligible for BNPL transactions and installment offers from FIs to pay for BNPL transactions. The payment network may match eligible items with installment offers, select the best installment offers for the buyer, and mediate exchanges between the parties to settle payments for the BNPL transaction.

20 Claims, 8 Drawing Sheets

(56) References Cited

U.S. PATENT DOCUMENTS

| | | | |
|---|---|---|---|
| 2012/0130889 A1* | 5/2012 | Lyons | G06Q 20/3272 |
| | | | 705/39 |
| 2014/0316991 A1* | 10/2014 | Moshal | G06Q 20/40 |
| | | | 705/64 |
| 2015/0287021 A1* | 10/2015 | Itwaru | G06Q 20/40 |
| | | | 705/44 |
| 2018/0047010 A1* | 2/2018 | Itwaru | G06Q 20/322 |
| 2018/0101849 A1* | 4/2018 | Itwaru | G06Q 20/4012 |
| 2021/0012417 A1* | 1/2021 | Atieque | G06Q 20/24 |
| 2021/0125262 A1* | 4/2021 | Corrieri | G06Q 30/0601 |
| 2022/0129895 A1* | 4/2022 | Mahalec | G06Q 20/401 |
| 2022/0391938 A1* | 12/2022 | Sridhar | G06Q 30/0224 |
| 2023/0004951 A1* | 1/2023 | Anderson | G06Q 40/03 |
| 2023/0063206 A1* | 3/2023 | Hunt | G06Q 20/20 |
| 2023/0092175 A1* | 3/2023 | Yates | G06Q 20/24 |
| | | | 705/14.36 |

* cited by examiner

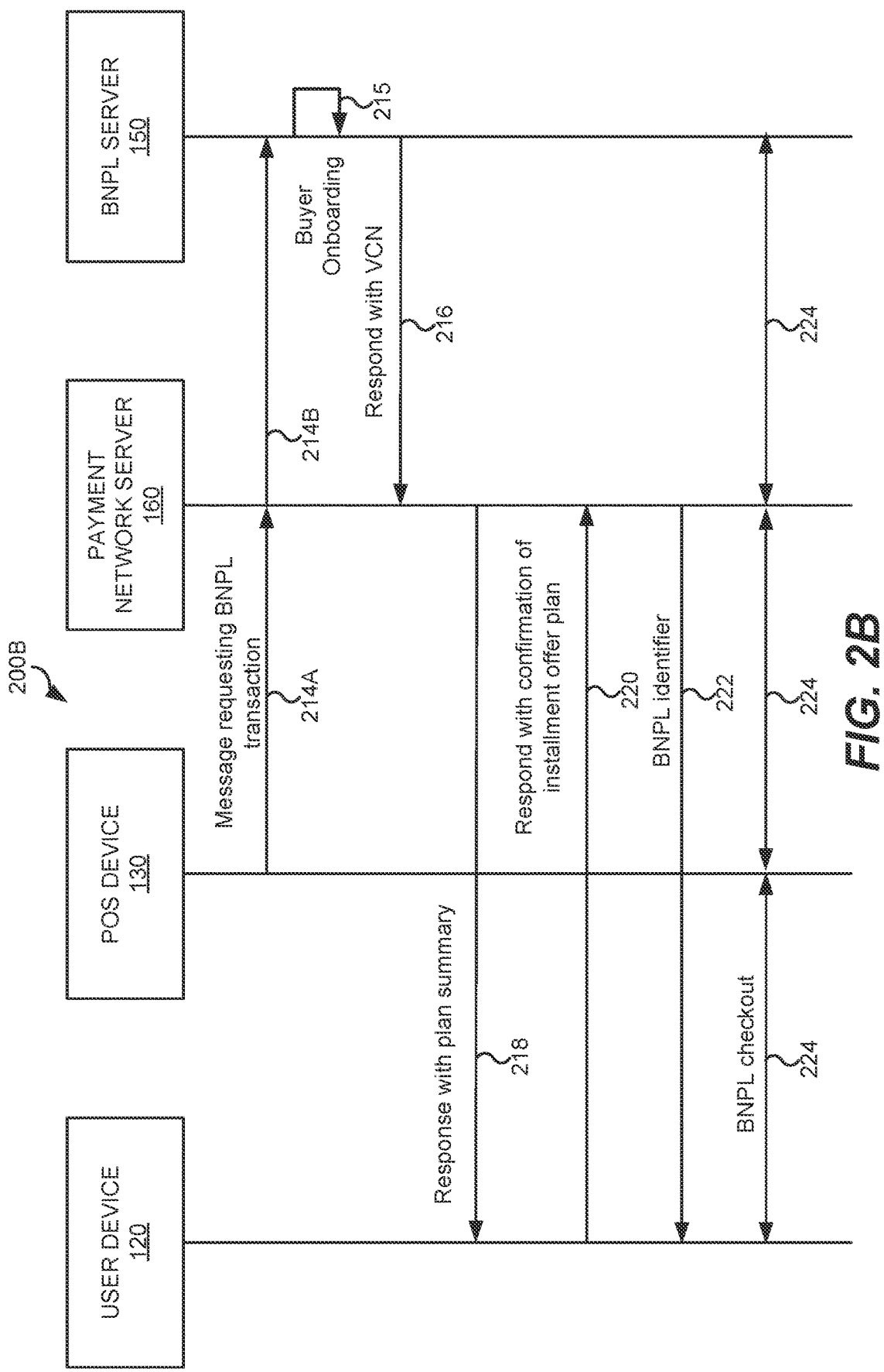

```
                                    400
```

RECEIVE, FROM THE BNPL SERVER, A VIRTUAL CARD NUMBER (VCN) AND A BNPL IDENTIFIER, AND STORE THE VCN AND THE BNPL IN ASSOCIATION WITH ONE ANOTHER
414

TRANSMIT THE BNPL IDENTIFIER TO THE USER DEVICE, WHEREIN THE USER DEVICE PRESENTS THE BNPL IDENTIFIER TO A POINT OF SALE (POS) DEVICE FOR PURCHASING THE ITEM USING THE INSTALLMENT OFFER
416

RECEIVE, FROM THE POS DEVICE, THE BNPL IDENTIFIER
418

ACCESS THE VCN BASED ON THE BNPL IDENTIFIER
420

TRANSMIT AN AUTHORIZATION REQUEST MESSAGE TO THE BNPL SERVER, THE AUTHORIZATION REQUEST MESSAGE COMPRISING THE INSTALLMENT OFFER AND THE VCN
422

RECEIVE AN APPROVAL RESPONSE FROM THE BNPL SERVER AND FORWARD THE APPROVAL RESPONSE TO THE POS DEVICE TO COMPLETE THE PAYMENT AUTHORIZATION FOR THE BNPL TRANSACTION
424

*FIG. 4B*

SYSTEMS AND METHODS OF ENCODING BNPL TRANSACTIONS FOR TERMINAL DEVICES

BACKGROUND

In recent years, there has been a rise in the use of e-commerce methods for purchasing items. These methods have leveraged new methods of paying for purchase transactions. However, many merchants continue to utilize transaction systems that cannot interface financial institutions that are increasingly using e-commerce systems. This lack of compatibility confines consumers to a limited number of transaction options, and it prevents merchants from leveraging novel transaction models. For example, brick-and-mortar locations of merchants may be unable to process Buy Now Pay Later (BNPL) transactions. A BNPL transaction is one in which a buyer purchases an item from a merchant and pays for some or all of the price of the item over time. Oftentimes, these BNPL transactions are financed by Financial Institutions (FIs) that provide a loan to pay the merchant for the "pay later" amount. The buyer typically takes delivery of the item immediately, and repays the FI according to the terms of the loan. Brick-and-mortar locations typically lack technology infrastructure for automating transactions with these FIs in a secure way. Merchants with limited or no electronic commerce presence may also find it difficult to conduct BNPL transactions with FIs for similar reasons.

BRIEF DESCRIPTION OF THE DRAWINGS

Features of the present disclosure may be illustrated by way of example and not limited in the following figure(s), in which like numerals indicate like elements, in which:

FIG. 2B illustrates a second portion of the data flow diagram illustrated in FIG. 2A;

FIG. 4B illustrates a second portion of the method illustrated in FIG. 4A.

DETAILED DESCRIPTION

Figure 1:
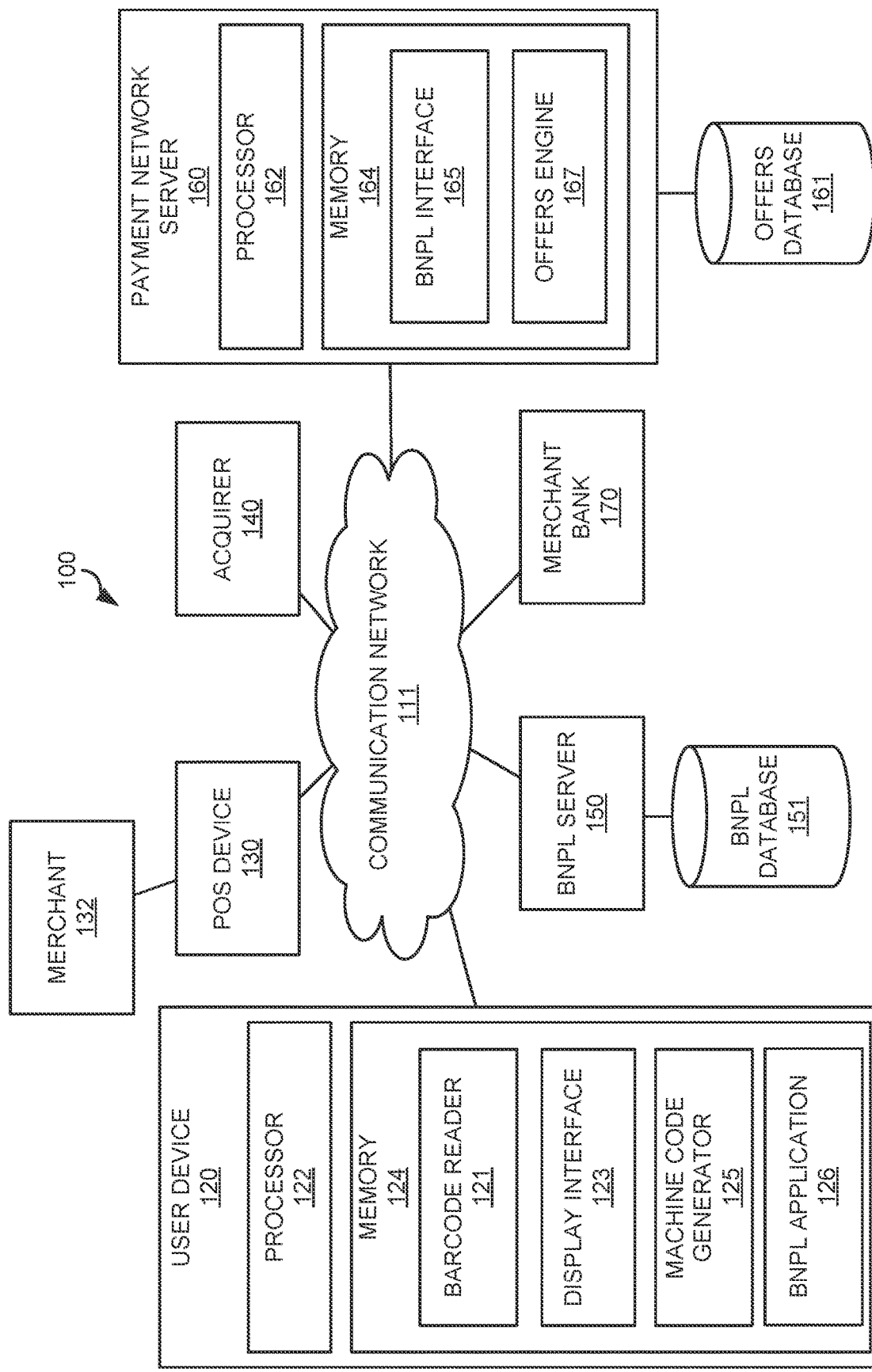
FIG. 1 illustrates a system environment for BNPL transactions at a physical location.

The disclosure relates to methods and systems of leveraging a trusted payment network to provide a technology platform for conducting BNPL transactions for merchants that would otherwise be unable to conduct these transactions. For example, these merchants may include those with brick-and-mortar locations or merchants that have limited e-commerce presence. For example, the methods and systems enable BNPL transactions for merchants that otherwise lack technology infrastructure to enter into these transactions with a financial institution. At the physical location, a specialized application executing at a user device operated by a buyer may decode purchase information from the POS device to obtain transaction information for a purchase. The transaction information may include a merchant identifier, an item identifier, and a purchase amount. The specialized application may transmit the transaction data directly to a payment network server of the trusted payment network to request a BNPL transaction. The payment network server may query an installment offers database to determine whether any of the items (such as products or services) identified by item identifiers are eligible for a BNPL transaction. For example, the merchant may have previously transmitted eligible item identifiers to the trusted payment network, which stores the eligible item identifiers in the installment offers database in association with a merchant identifier that identifies the merchant.

If any of the items are eligible, the payment network server may identify one or more best offers from among installment offers in the installment offer database. An installment offer is an offer from a financial institution to finance a purchase at a merchant. Each installment offer may include an identity of the financial institution, repayment terms, and qualification criteria. The terms of the offer may include a number of payments, interest rate, and/or other data regarding repayment. The qualification criteria may specify the minimum creditworthiness of a buyer for qualification. One or more best offers are the top N (where N is a non-zero integer) offers among all applicable installment offers ranked based on ranking criteria, which may include the repayment terms, qualification criteria, and/or other data known about the installment offers. The payment network server may transmit the best offers to the specialized application.

The specialized application may receive the best offers from the payment network server and present them for display to a user, such as via input/output devices of the user device. If the buyer (user of the user device) decides to use one of the best offers, the buyer may make such an indication to the merchant. For example, the customer may indicate to a cashier or may select an option on the POS device for a BNPL transaction. Alternatively, the buyer may provide an input to initiate a BNPL transaction via the specialized application, which may provide the indication to the POS device. In some examples, the specialized application may receive a selection of an installment offer from among the best offers, and initiate a BNPL transaction to pay for some or all items at the physical location based on the selected installment offer.

Responsive to the indication from the buyer, the POS device may initiate a BNPL transaction through the payment network server. For example, the POS device may transmit, to the payment network, an authorization request message that encodes a BNPL indication and the transaction identifier. The POS device may encode the authorization request message via ISO 8583. In some examples, if the original checkout includes items that will not use a BNPL transaction for payment, the POS device may bifurcate the purchase into a BNPL purchase and non-BNPL purchase. The non-BNPL purchase will be processed according to business-as-usual (BAU) POS checkout.

The payment network server may receive the authorization request message and decode the BNPL indication. Responsive to the decoding, the payment network server may transmit details of the selected installment offer to the user device and initiate an onboarding procedure with a BNPL server operated by a financial institution. During the onboarding procedure, the BNPL server may be provided with one or more credit credentials of the buyer. For example, the BNPL server may receive the credit credentials from the buyer (via specialized application) and/or from the payment network server. The credit credentials may include an identity of the buyer, credit scores, income information, and/or other information that indicates creditworthiness of the buyer. The BNPL server may determine whether the buyer is qualified to receive the selected installment offer based on the credit credentials of the buyer and the qualification criteria of the selected installment offer.

If the BNPL server determines that the buyer is qualified to receive the installment offer, the BNPL server may generate an account identifier and a BNPL identifier. The account identifier identifies an account at the FI from which to debit funds to pay for the BNPL transaction. For example, the account identifier may be a virtual card number (VCN) and/or other identifier recognized by the payment network that identifies the account. The BNPL identifier is a unique identifier such as a BNPL transaction identifier that is to be associated with the account identifier so that the BNPL identifier may be used to obtain the account identifier. The BNPL identifier may be encoded into a machine-readable code such as a Quick Response (QR) code.

The BNPL server may transmit the account identifier and the BNPL identifier to the payment network server. The payment network server may store the account identifier and the BNPL identifier in association with another. The payment network server may transmit, to the user device, a plan summary of the now-approved installment offer. The plan summary may include the identity of the financial institution and the repayment terms.

The BNPL server may also transmit the BNPL identifier to the user device, either directly or via the payment network. For example, the BNPL server may transmit the machine-readable code that encodes the BNPL identifier to the user device. The foregoing minimizes exposure of the account identifier across public networks. Thus, when the account identifier is a VCN, not only is the original account identifier obfuscated through the VCN, exposure of the VCN is also minimized.

At checkout, the user device may provide the BNPL identifier to the POS device. For example, the user device may display and the POS device may scan the machine-readable code. The POS device may access the BNPL identifier, such as by decoding the machine-readable code, and transmit the BNPL identifier to the payment network server for processing the BNPL transaction. For example, the POS device may transmit an authorization request message that includes the BNPL identifier, a payment amount, and an indication that the request is for payment of an approved installment offer and BNPL processing.

The payment network server may receive the BNPL identifier, lookup the associated account identifier (such as the VCN) and process a payment for the payment amount using the account identifier similar to the way in which credit or other payment card processing is performed. In this way, the payment network may leverage payment technology ordinarily used for credit card or other payment accounts to transfer funds from financial institutions that finance BNPL purchase amounts to the merchant. As such, the specialized application and the payment network may be leveraged to provide BNPL transactions at physical locations that would otherwise not be able to handle these transactions with financial institutions that finance BNPL transactions.

FIG. 1 illustrates a system environment 100 for BNPL transactions at a physical location. The system environment 100 may include a user device 120, a POS device 130, an acquirer 140, a BNPL server 150, a payment network server 160, a merchant bank 170, and/or other features. These features of the system environment 100 may be connected to one another through a communication network 111.

The user device 120 is hardware that interacts with a computer, network, or other electronic device. For example, the user device may include input/output (IO) devices. Input devices allow users to input data into a computer or other electronic device. Output devices allow users to see or hear the output of a computer or other electronic device. The user device 120 may be a mobile device such as a smartphone, tablet, e-reader, netbook, or smartwatch. Furthermore, the user device 120 may be a desktop or laptop computer. The user device 120 may be connected to the internet through Wi-Fi, ethernet, dial-up, cable, digital subscriber line, or fiber optic. Moreover, the user device 120 may not be connected to the internet. The user device 120 may contain a display, battery, camera, speakers, microphone, and ports.

In one example, the user device 120 may communicate with the POS device 130, acquirer 140, and payment network server 160 through a communication network 111.

The user device 120 may include a processor 122 and a memory 124. The processor 122, also known as a central processing unit (CPU), is responsible for carrying out the instructions that are given to it by the software. The processor 122 may be a chip. The processor 122 may be made from silicon, germanium, or gallium arsenide. The processor 122 may be located on or in the motherboard of the user device 120. The processor 122 may run the software stored in the memory 124 of the user device 120.

The memory 124 is a non-transitory storage medium that stores data. The memory 124 determines how much data a device can store and how quickly it can access that data. The stored data may include operating system files, application programs, user data, and/or temporary files. The memory 124 may be divided into random access memory (RAM) and storage. RAM is the short-term memory of a device. Storage is the long-term memory of a device. Memory 124 can be dynamic random-access memory, static random-access memory, read-only memory, or flash memory. The memory 124 may be used to store additional data and/or software. The memory 124 may interact with the processor 122 so that the user device 120 can run an application. The memory 124 may store a barcode reader 121, a display interface 123, a machine code generator 125, a BNPL application 126, and/or other instructions.

The BNPL application 126 is a specialized application that specifically programs the user device 120 to participate in a BNPL transaction, such as by performing various functions of the user device 120 described herein. The BNPL application 126 may be provided for download by the payment network. For example, the payment network may provide the BNPL application 126 for download through one or more intermediaries such as an app store.

The barcode reader 121 is software and/or hardware that can read and interpret a machine-readable code, which is an encoding of data that can be decoded by a computer such as the user device 120. The machine-readable code may include a graphical representation that encodes data such as numbers or letters. Examples of a machine-readable code may include a one-dimensional barcode such as, without limitation, a universal product code (UPC), a European article number (EAN), a code 39, a code 128, or an interleaved 2 of 5, a two-dimensional barcode such as, without limitation, a QR code, a DataMatrix, s PDF417, an Aztec code, or a MaxiCode, and/or other type of graphical representation from which data may be decoded by a machine. The barcode reader 121 may employ optical recognition to read the machine code. The barcode reader 121 may be a linear barcode reader, a 2D barcode reader, an application, or a camera. In one example, the barcode reader 121 may be used to scan a QR code, decode the information therein, and display the information on the user device 120. The barcode reader 121 may run on the processor 122. In a particular implementation, the BNPL application 126 may cause an onboard camera of the user device 120 to take a picture of the machine-readable code, which may be printed on a receipt or displayed on an electronic display, and execute the barcode reader 121 to decode the machine-readable code in the image.

The display interface 123 is a system that transfers digital image data to a display. This display may be located on the user device 120 itself or on an external device. An external device may include a monitor, television, tablet, smartphone, head-mounted display, or e-reader. When using an external display, the display interface 123 may be VGA, DVI, HDMI, or DisplayPort. The display may utilize liquid crystal display (LCD) technology. The display may have a user interface. The user interface is the part of a device that allows users to interact with it. The user interface can include hardware and/or software elements. The user interface may be a graphical user interface, command-line interface, natural language interface, haptic interface, or augmented reality interface. In one example, the display interface 123 may allow the user device 120 to display installment offers for a user to select. In another example, the user may select an installment offer using the user interface, which sends information from the display to the user device 120 via the display interface 123. The display interface 123 may run on the processor 122.

The machine code generator 125 is hardware and/or software that encodes data into a format that can be scanned by a machine code scanner. For example, the machine code generator 125 may divide the data into a barcode, which may be a series of bits and encode the bits into a series of black and white bars or squares, or other graphical representation. The machine code generator 125 may send a finished barcode to the display interface 123 for display to the user. In another example, the machine code generator 125 may use data regarding transaction information and the VCN to create machine-readable code. The machine code generator 125 may run on the processor 122.

The POS device 130 is hardware and/or software used by a merchant 132 to process payments. The POS device 130 may include a cash register, tablet POS, desktop POS, cloud-based POS, or mobile POS. The POS device 130 may include or be connected to a display such as a touchscreen display, an input device such as a keyboard, and/or a payment processing system.

Furthermore, the POS device 130 may be used to track inventory, manage customer loyalty programs, generate reports, connect with accounting software, print receipts, and/or connect with inventory management systems. In one example, the POS device 130 may be used to provide item details, including item ID and price, to the user device 120. In another example, the POS device 130 may send eligible BNPL item information to the payment network server 160. In yet another example, the POS device 130 may have an attached or displayed QR code for the user device 120 to scan.

The acquirer 140 is a financial institution that acts as an intermediary between the merchant 132 and the payment network server 160. The acquirer 140 may be an independent acquirer, network acquirer, or specialized acquirer. The acquirer 140 may provide the merchant 132 with a dedicated account where customer payments can be deposited and ultimately at a merchant account of a merchant bank 170. The acquirer 140 may also handle the technical aspects of processing card payments such as, without limitation, authorization and settlement of funds to the merchant account at the merchant bank 170. Furthermore, the acquirer 140 may provide fraud prevention services, reports on payment transactions, and/or customer support services. The acquirer 140 may be used to link the POS device 130 to the payment network server 160. In one example, the acquirer 140 may settle funds with the merchant 132 and/or provide financial reports to the merchant 132.

The BNPL server 150 is a computer device of a financial institution (FI) that finances BNPL transactions. An installment offer is an offer to provide a payment plan that finances a purchase with a payment schedule that defines payments over time, often in equal installments. The FI may charge fees in exchange for financing such as interest fees, late payment fees, and early repayment fees. An installment offer may include data that describes the installment offer such as a minimum or maximum finance amount, a minimum or maximum number of installments, a minimum or maximum number of payments, an interest rate, a late payment fee, an early repayment penalty, an expiration date, eligibility criteria specifying the criteria that customers must meet in order to qualify for the offer, and/or other data relating to the installment offer. A purchase transaction using an installment offer is referred to as a BNPL transaction because a consumer may buy a product or service now and pay later subject to the installment offer.

The BNPL server 150 may transmit available installment offers to the payment network server 160 using data stored in a BNPL database 151. The BNPL server 150 may receive information about a consumer and their selected installment offer from the payment network server 160. The BNPL server 150 may pay the merchant for the full price of the item that the consumer purchased with an installment offer; this transaction may occur with the acquirer 140. The BNPL server 150 may be in communication with the BNPL database 151.

The BNPL database 151 is a database that contains information relating to installment offers. A database is a collection of data organized such that it can easily be accessed, managed, and updated. The BNPL database 151 may be organized as a table: a collection of related data made up of rows and columns. The BNPL database 151 may be stored in a file format such as, without limitation, Structured Query Language (SQL), which allows for easy access and management. The BNPL database 151 may be managed by a database management system (DBMS) such as, without limitation, MySQL or Oracle, which controls access to the database and ensures correct data storage within the database. The BNPL database 151 may include information associated with the consumer such as, without limitation, an identification associated with a certain consumer, approval information, credit worthiness of the consumer, and/or an amount of credit that can be extended to the consumer. Additionally, the BNPL database 151 may contain information associated with installment offers contained within the database including an identification, an item identifier to identify the item, a total price, a number of installments, a price of each installment, a timeline for installment payment, an interest rate, a late payment fee, an early repayment penalty, an expiration date, and/or eligibility criteria specifying the criteria that customers must meet in order to qualify for the offer. The BNPL database 151 may also contain merchant information such as, without limitation, a merchant identifier associated with a certain merchant and the items available for purchase with installment offers through the merchant. The BNPL database 151 may send requested information to the BNPL server 150.

The payment network server 160 is a computer system that facilitates the processing of electronic payments. The payment network server 160 may process a variety of payment methods including credit cards, debit cards, and electronic wallets. The payment network server 160 may process payments by validating payment information and authorizing payment. The payment network server 160 may provide fraud protection and data encryption. The payment network server 160 may receive information associated with installment offers from the user device 120, the POS device 130, and/or the BNPL server 150. Furthermore, the payment network server 160 may sort installment offers. In one example, the payment network server 160 may send a VCN and/or a confirmation of a VCN to the user device 120. The payment network server 160 may include a processor 162 and a memory 164, and the payment network server 160 may be in communication with an offers database 161.

The processor 162, also known as a central processing unit (CPU), carries out the instructions given to it by the software. The processor 162 may be a chip. The processor 162 may be made from silicon, germanium, or gallium arsenide. The processor 162 may be located on or in the motherboard of the payment network server 160. The processor 162 may run the software stored in the memory 164 of the payment network server 160.

The memory 164 is a non-transitory storage medium that stores data and instructions. The memory 164 determines how much data a server can store and how quickly it can access that data. The stored data may include operating system files, application programs, user data, process requests, and temporary files. The memory 164 may be divided into random access memory (RAM) and storage. RAM is the short-term memory of a server. Storage is the long-term memory of a server. Memory 164 can be dynamic random-access memory, static random-access memory, read-only memory, or flash memory. The memory 164 may be used to store additional data and/or software. The memory 164 may store a BNPL interface 165 and an offers engine 167.

The BNPL interface 165 is software that manages the collection and distribution of information associated with installment offers. The BNPL interface 165 may be integrated with one or more BNPL institutions (such as BNPL server 150) to gather installment offers and store the data associated with those installment offers in the offers database 161. The BNPL interface 165 may be used to gather information regarding items available for purchase with installment offers from a number of merchants and store that information in the offers database 161. The BNPL interface 165 may be used to check the offers database 161 to see if an installment offer from a BNPL institution (such as BNPL server 150) has expired, and if it has, remove it from the offers database 161. The BNPL interface 165 may run on the processor 162.

The offers engine 167 is software that manages and sorts purchasing offers. In one embodiment, the offers engine 167 may use data from the offers database 161 to sort installment offers from a plurality of offers based on ranking criteria to identify one or more best offers from among the plurality of offers.

One or more "best offers" are the top N (where N is a non-zero integer) offers among all applicable installment offers ranked based on ranking criteria, which may include the repayment terms, qualification criteria, personalized criteria including historical selections by the buyer or demographically similar buyers, and/or other data known about the installment offers. The payment network server may transmit the best offers to the specialized application. For example, the personalized criteria may be based on data of installment offers accepted by the current buyer, denied by the current buyer, accepted by demographically similar buyers, denied by demographically similar buyers, and/or other data known about the buyer that would indicate a preference for one installment over another installment offer. These preferences can include a preference minimize or maximize the term, minimize the interest rate, FI preferences, and/or other repayment preferences.

The ranking criteria may depend on information associated with the installment offer such as, without limitation, an item identifier used to identify the item, a total price, a number of installments, a price of each installment, a timeline for installment payment, an interest rate, a late payment fee, an early repayment penalty, an expiration date, and/or eligibility criteria specifying the criteria that customers must meet in order to qualify for the offer. For example, this sorting method may result in an ordered list of installment offers, wherein each subsequent installment offer on the list after the first offer is less likely to be selected by the user based on the data used in the ranking process. In another example, this list may not include installment offers that will likely not be selected by the user based on the data used in the ranking process. The offers engine 167 may match available installment offers from a BNPL server 150 to items available for purchase through installment offers from a merchant. The offers engine 167 may run on the processor 162.

The offers database 161 is a database that contains information relating to installment offers. These installment offers may be collected from a number of BNPL institutions (such as BNPL server 150) by the BNPL interface 165 and stored in the offers database 161. A database is a collection of data that is organized so that it can be easily accessed, managed, and updated. The offers database 161 may be organized as a table: a collection of related data made up of rows and columns. The offers database 161 may be stored in a file format such as, without limitation, Structured Query Language (SQL) that allows for easy access and management. The offers database 161 may be managed by a database management system (DBMS) such as, without limitation, MySQL or Oracle, which controls access to the database and ensures correct data storage within the database. The offers database 161 may store a number of identifiers that keep track of relevant entities involved with the installment offer such as, without limitation, an installment offer identifier, a FI identifier that identifies a FI associated with the BNPL server 150 providing the corresponding installment offer, an item identifier associated with the item to be purchased with the installment offer, and/or a merchant identifier associated with the merchant selling the item available for purchase through an installment offer. The offers database 161 may also store data relating to installment offers, including an item code to identify the item, a total price, a number of installments, a price of each installment, a timeline for installment payment, an interest rate, a late payment fee, an early repayment penalty, an expiration date, and/or eligibility criteria specifying the criteria that customers must meet in order to qualify for the offer. The offers database 161 may also store information associated with the items available for purchase through an installment offer such as, without limitation, the merchant offering the item and/or the price of the item. The offers database 161 may send requested information to the payment network server 160.

The communication network 111 is a system of interconnected nodes that allow for the transmission of information. The nodes in the communication network 111 can be computers or other devices. The communication network 111 may be a broadcast network or a point-to-point network. Furthermore, the communication network 111 may be a wired network such as, without limitation, ethernet, token ring, fiber optic, or coaxial, and/or a wireless network such as, without limitation, wi-fi, Bluetooth, ZigBee, LTE, or 5G. The communication network 111 may be a computer network such as, without limitation, the internet, local areas networks (LANs), wide area networks (WANs), metropolitan area networks (MANs), intranet, and/or extranet. The communication network 111 may facilitate the interfacing between the user device 120, the POS device 130, the acquirer 140, the BNPL server 150, the payment network server 160, and the merchant bank 170. For example, information such as data associated with installment offers may be sent across the communication network 111. In another example, financial transactions may occur over the communication network 111.

Figure 2A:
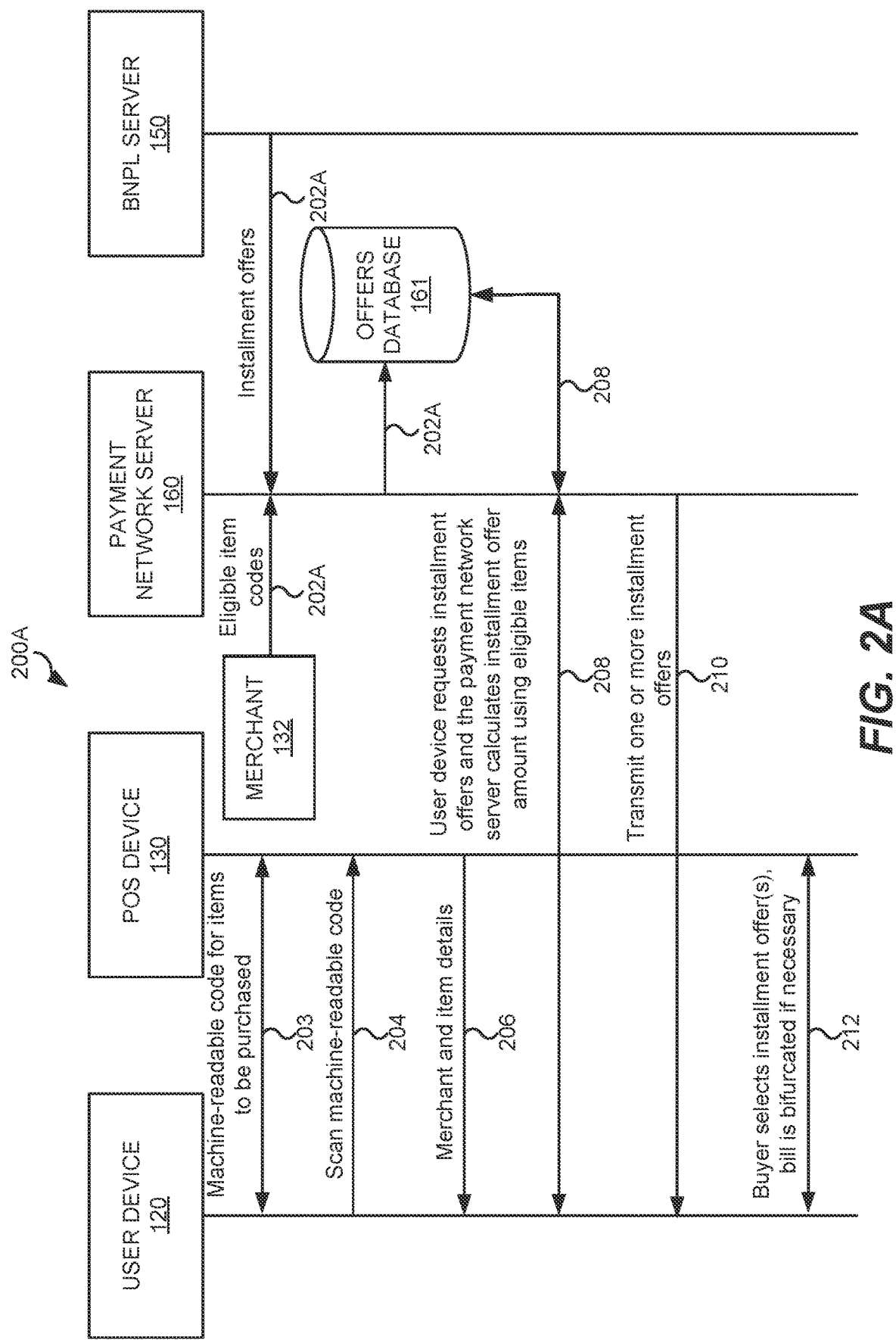
FIG. 2A illustrates a first portion of a data flow diagram for completing a BNPL transaction in the system environment illustrated in FIG. 1.

FIG. 2A illustrates a first portion 200A of a data flow diagram for completing a BNPL transaction in the system environment 100 illustrated in FIG. 1. FIG. 2B illustrates a second portion 200B of the data flow diagram illustrated in FIG. 2A. At 202A, the merchant 132 may transmit eligible item codes to the payment network server 160. The eligible item codes identify products and/or services that can be purchased from the merchant 132 using a BNPL transaction. The eligible item codes may include, for example, UPCs that identify items that the merchant 132 determines can be purchased now but paid for later. Likewise at 202B, the BNPL server 150 may transmit installment offers to the payment network server 160. It should be understood that 202A and 202B will typically occur at different times and are not necessarily synchronized in any way with one another. The payment network server 160 may store the eligible item codes in association with a merchant identifier that identifies the merchant 132 in the offers database 161. Likewise, the payment network server 160 may store the installment offers in association with a FI identifier that identifies the FI operating the BNPL server 150 that provides the installment offers. It should be noted that other merchants 132 may provide their respective eligible item codes and the BNPL servers 150 of other FIs may provide their respective installment offers.

In operation, a buyer such as a customer of the merchant 132, may perform an initial check out procedure to purchase one or more items at the merchant 132. Such check out may occur at a physical location of the merchant 132 in which there would otherwise be no technological infrastructure to communicate with BNPL lenders such as the FI that operates the BNPL server 150. In other examples, the system may be implemented via an online store of the merchant 132. At 203, the merchant 132 may generate and provide a machine-readable code that encodes purchase details such as a merchant identifier, a date, a location, item identifiers such as UPC codes that identify items being checked out, price of the items, and/or other information about the check out. The machine-readable code will be described as a QR code for illustrative convenience in FIGS. 2A and 2B, but other types of machine-readable codes may be used. The POS device 130 may provide the QR code by displaying the code on an electronic display and/or may print the QR code using a printer device.

At 204, the user device 120 may scan the machine-readable code, such as from the screen of the POS device 130 or from the printed QR code. For example, the BNPL application 126 executing at the user device 120 may use the barcode reader 121 to scan the QR code.

At 206, the POS device 130 (or other device of the merchant 132) may transmit the merchant identifier and item details decoded from the QR code to the user device 120. The item details may include, without limitation, one or more item identifiers that each identifies an item involved in the transaction, and/or the price of the item.

At 208, the user device 120 may transmit a request for installment offers to the payment network server 160. The request may include item details such as the one or more item identifiers and merchant identifier. The payment network server 160 may identify any items from the item details that are eligible for BNPL based on items previously registered by the merchant 132 and stored in the offers database 161. Responsive to the request, payment network server 160 may calculate installment offer amounts based on the prices of the eligible items. In some examples, the payment network server 160 requests installment offers from the offers database 161 and uses the offers engine 167 to identify best offers from among the installment offers stored in the offers database 161.

At 210, the payment network server 160 may transmit one or more installment offers to the user device 120. In some examples, these installment offers are "best offers" that have been sorted according to a ranking criteria using the offers engine 167.

At 212, the buyer may select one or more installment offers for BNPL and the receipt for the checkout may be bifurcated: one with BNPL items and one with non-BNPL items. In examples in which bifurcation occurs, the buyer may then pay for the non-BNPL items using business-as-usual payment processing at the POS device 130. In should be noted that the user device 120 may transmit the selection of the installment offer to the POS device 130 and/or the buyer may simply indicate via an user interface of the POS device or operator of the POS device 130 that BNPL is to be initiated.

Referring now to FIG. 2B, at 214A, the POS device 130 may initiate a BNPL transaction based on the selected installment offer. For example, the POS device 130 may transmit a message to the payment network server 160 in a messaging format used by the payment network, such as the ISO 8583 message format. The message may include a transaction type that indicates a BNPL transaction is requested, an amount of the BNPL transaction being requested (for the items the buyer elected for BNPL), an identification of the FI associated with selected installment offer, an identification of the buyer for credit checking purposes, and/or other information.

At 214B, the payment network server 160 may identify the FI encoded in the message and route the message to the BNPL server 150 and/or otherwise provide the BNPL server 150 with an identification of the selected installment offer, an identification of the buyer, an amount of the BNPL transaction being requested, and/or other data relating to the selected installment offer.

At 215, the BNPL server 150 may receive the message, identify the buyer from the message, and perform a credit check based on the buyer identification to determine creditworthiness of the buyer. The BNPL server 150 may determine whether the buyer qualifies for the installment offer based on the FI's internal rules for credit determinations, the installment offer's credit requirements, and the buyer's creditworthiness. If the BNPL server 150 determines that the buyer does not qualify for the installment offer, then the BNPL server 150 may return a message to the payment network indicating that the request has been denied and optionally provide a reason for such denial in the response. The remaining portions of denial handling may occur similar to credit card denials in the payment network. The remaining portions of FIG. 2B assume that the buyer has been qualified for the installment offer.

If the BNPL server 150 determines that the buyer is qualified for the installment offer, the BNPL server 150 may set up a BNPL account for the buyer for repayment and generate an account identifier that identifies an account at the FI that is used to pay the merchant 132 for the BNPL amount. The account identifier may be a VCN. A VCN is a temporary, typically one-time use card number (such as a bank card number) that is linked to an actual payment account (such as an actual bank account). Thus, sharing a VCN allows transmission of an identifier that is usable within a payment network without sharing the actual card number, improving the security of BNPL transactions. The BNPL server 150 may also generate a BNPL identifier (or the BNPL identifier may be the transaction identifier encoded in the original message from the POS device 214A).

At 216, the BNPL server 150 may transmit the VCN (or other account identifier) and the BNPL identifier to the payment network server 160, which may store the VCN and the BNPL identifier in association with one another.

At 218, the payment network server 160 may transmit, to the user device 120, the response from the FI and a plan summary that provides information about repayment of the installment offer.

At 220, the user device 120 may respond with a confirmation of the installment offer plan.

At 222, the payment network server 160 may transmit an indication that the VCN was generated and received, and may transmit the BNPL identifier to the user device 120.

At 224, the user device 120 may initiate a BNPL checkout. The BNPL checkout may include the user device 120 may providing the BNPL identifier to the POS device 130. For example, the user device 120 may generate a machine-readable code and display the code for scanning by the POS device 130. The POS device 130 may receive the BNPL identifier (such as by scanning and decoding the machine-readable code), and lookup the VCN associated with the BNPL identifier. The POS device 130 may transmit an authorization request message to the payment network server 160 with the VCN and the payment amount. The payment network server 160 may identify the FI that issued the VCN, and route or otherwise transmit the authorization request message to the BNPL server 150. The BNPL server 150 may authorize the purchase amount, update its records to indicate that the installment offer associated with the BNPL identifier has been paid out and should be repaid by the buyer per the agreed upon installment offer plan, and transmit back and approval message. The payment network server 160 may transmit the approval message back to the POS device 130, which may complete the BNPL transaction. The buyer may take delivery of the item after this checkout and may be provided with a receipt for the BNPL transaction and any bifurcated non-BNPL transaction. The buyer may then repay the FI that provided the VCN and payment for the BNPL transaction according to the installment offer plan.

Figure 3A:
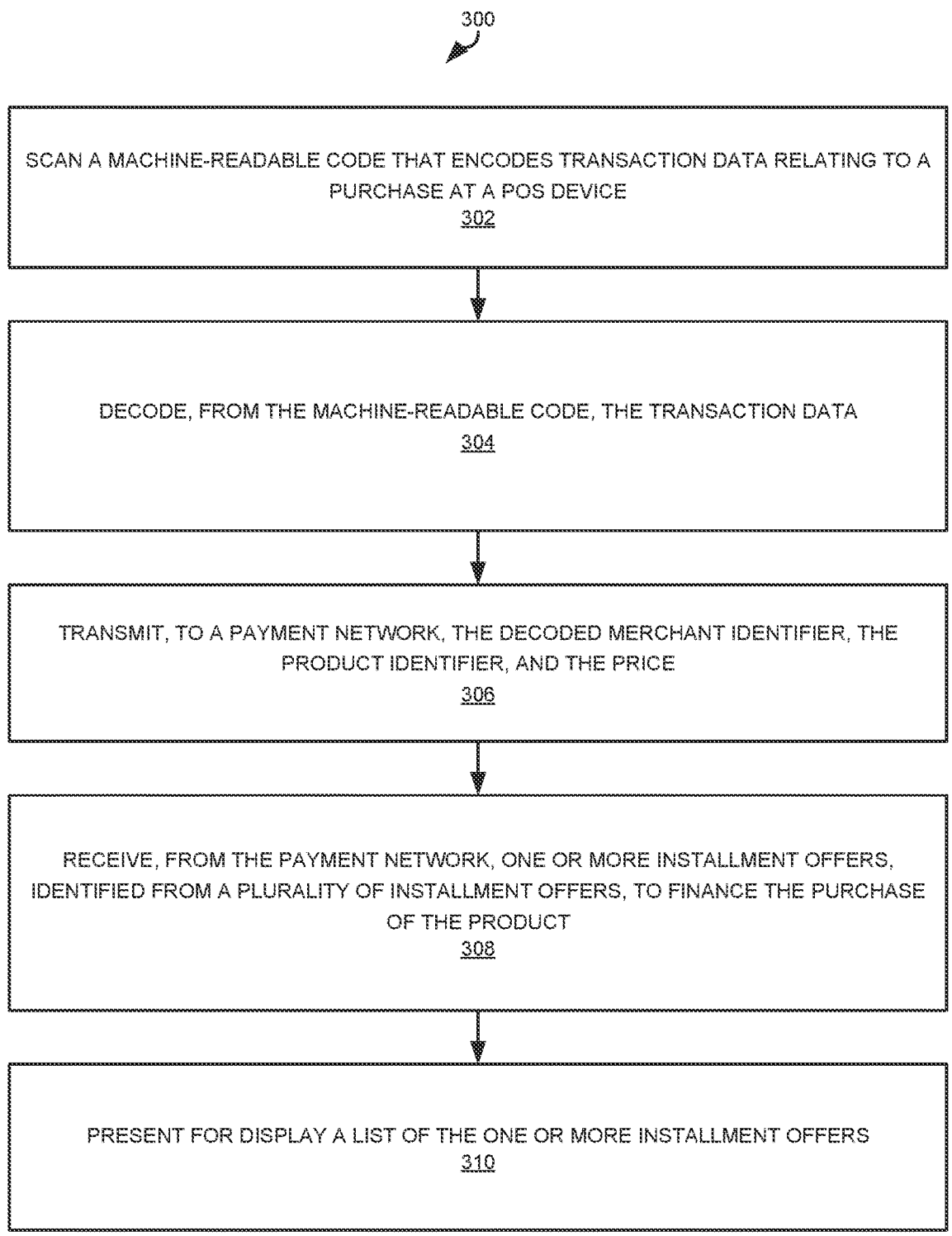
FIG. 3A illustrates a first portion of a method for completing a BNPL transaction from a user device.
Figure 3B:
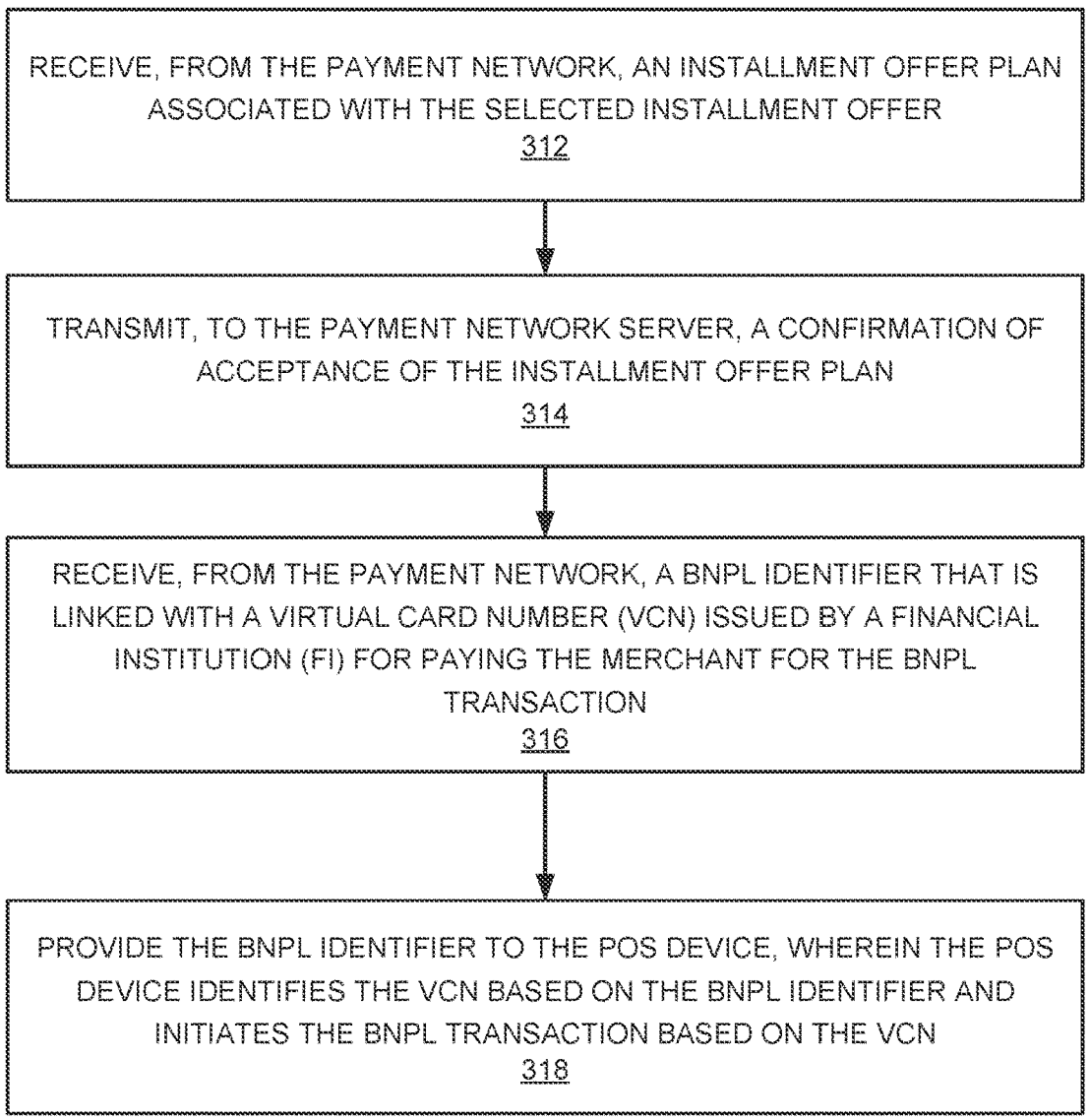
FIG. 3B illustrates a second portion of the method illustrated in FIG. 3A.

FIG. 3A illustrates a first portion of a method 300 for completing a BNPL transaction from a user device 120. FIG. 3B illustrates a second portion of the method 300 illustrated in FIG. 3A. At 302, the method 300 may include scanning, by a user device (such as the user device 120), a machine-readable code that encodes transaction data relating to a purchase at the POS device (such as the POS device 130). In some examples, the machine-readable code is a QR code, bar code, or another image. In some examples, the machine-readable code is located on the bill or receipt of the purchase.

At 304, the method 300 may include decoding, by the user device 120, from the machine-readable code, the transaction data comprising a merchant identifier that identifies the merchant, an item identifier that identifies an item involved in the transaction, and a price of the item.

At 306, the method 300 may include transmitting, by the user device, to a payment network (such as the payment network server 160), the decoded merchant identifier, the item identifier, and the price. In some examples, the merchant shares, with the payment network (such as the payment network server 160), the item identifier of one or more items eligible for purchase with an installment offer. The payment network (such as the payment network server 160) may then store the item identifier of one or more items in an offers database (such as the offers database 161), the offers database (such as the offers database 161) being queried when the application requests the item identifier.

At 308, the method 300 may include receiving, by the user device, from the payment network (such as the payment network server 160), one or more installment offers, identified from a plurality of installment offers, to finance the purchase of the item. In some examples, the payment network (such as the payment network server 160) sorts the one or more installment offers from a plurality of offers based on a ranking criteria. The ranking criteria may be based on data of installment offers accepted by the current user, denied by the current user, accepted by previous users, and/or denied by previous users.

At 310, the method 300 may include presenting, by the user device, for display a list of the one or more installment offers.

Referring now to FIG. 3B, at 312, the method 300 may include receiving, by the user device, from the payment network, an installment offer plan associated with the selected installment offer.

At 314, the method 300 may include transmitting, by the user device, a confirmation of acceptance of the installment offer plan.

At 316, the method 300 may include receiving, by the user device, from the payment network, a BNPL identifier that is linked with a virtual card number (VCN) issued by a financial institution (FI) for paying the merchant for the BNPL transaction.

At 318, the method 300 may include providing, by the user device, the BNPL identifier to the POS device, wherein the POS device identifies the VCN based on the BNPL identifier and initiates the BNPL transaction based on the VCN. For example, the user device may generate a machine-readable code that encodes the BNPL identifier, and may display the machine-readable code, which is scanned by the POS device.

Figure 4A:
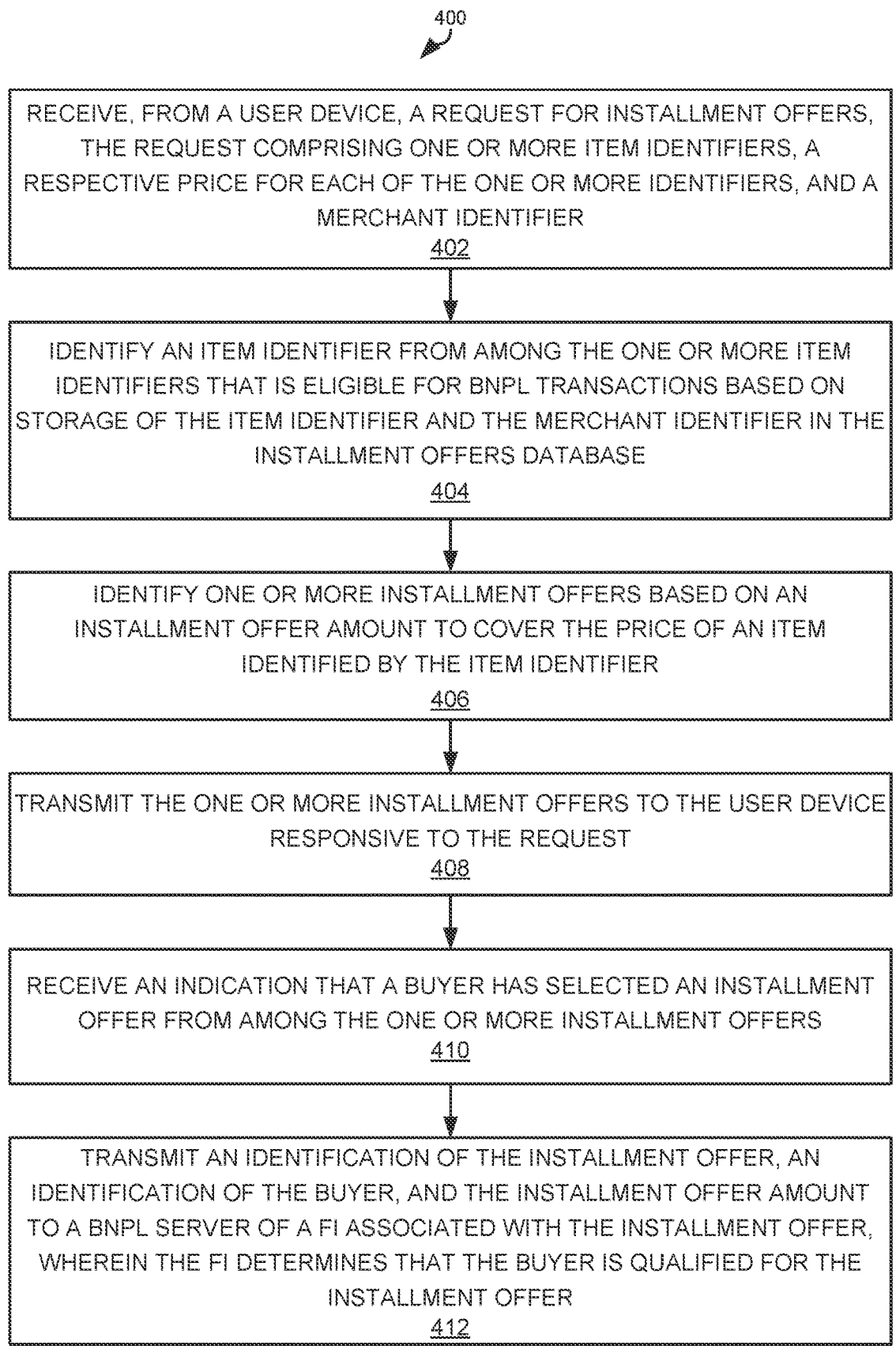
FIG. 4A illustrates a first portion of a method for completing a BNPL transaction by a payment network server.

FIG. 4A illustrates a first portion of a method 400 for completing a BNPL transaction by a payment network server 160. FIG. 4B illustrates a second portion of the method 400 illustrated in FIG. 4A. At 402, the method 400 may include receiving, from a user device (such as user device 120), a request for installment offers, the request comprising one or more item identifiers, a respective price for each of the one or more identifiers, and a merchant identifier.

At 404, the method 400 may include identifying an item identifier from among the one or more item identifiers that is eligible for BNPL transactions based on storage of the item identifier and the merchant identifier in the installment offers database (such as the database 161).

At 406, the method 400 may include identifying one or more installment offers based on an installment offer amount to cover the price of an item identified by the item identifier.

At 408, the method 400 may include transmitting the one or more installment offers to the user device responsive to the request.

At 410, the method 400 may include receiving an indication that a buyer has selected an installment offer from among the one or more installment offers.

At 412, the method 400 may include transmitting an identification of the installment offer, an identification of the buyer, and the installment offer amount to a BNPL server (such as BNPL server 150) of a FI associated with the installment offer, wherein the FI determines that the buyer is qualified for the installment offer.

At 414, the method 400 may include receiving, from the BNPL server, a virtual card number (VCN) and a BNPL identifier, and store the VCN and the BNPL in association with one another.

At 416, the method 400 may include transmitting the BNPL identifier to the user device, wherein the user device presents the BNPL identifier to a POS device (such as the POS device 130) for purchasing the item using the installment offer.

At 418, the method 400 may include receiving, from the POS device, the BNPL identifier.

At 420, the method 400 may include accessing the VCN based on the BNPL identifier.

At 422, the method 400 may include transmitting an authorization request message to the BNPL server, the authorization request message comprising the installment offer and the VCN.

At 424, the method 400 may include receiving an approval response from the BNPL server and forward the approval response to the POS device to complete the payment authorization for the BNPL transaction.

Figure 5:
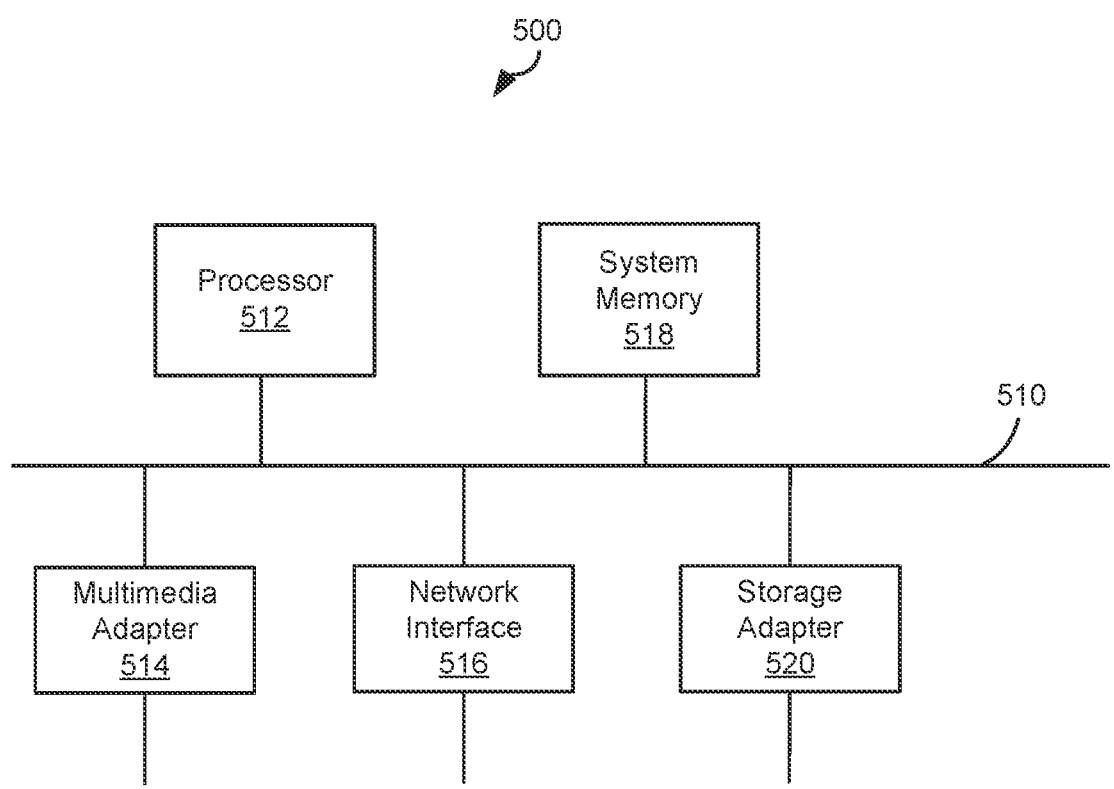
FIG. 5 illustrates an example of a computer system that may be implemented by devices illustrated in FIG. 1.

FIG. 5 illustrates an example of a computer system 500 that may be implemented by devices illustrated in FIG. 1. The computer system 500 may be part of or include the system environment 100 to perform the functions and features described herein. For example, various ones of the devices of system environment 100 may be implemented based on some or all of the computer system 500.

The computer system 500 may include, among other things, an interconnect 510, a processor 512, a multimedia adapter 514, a network interface 516, a system memory 518, and a storage adapter 520.

The interconnect 510 may interconnect various subsystems, elements, and/or components of the computer system 500. As shown, the interconnect 510 may be an abstraction that may represent any one or more separate physical buses, point-to-point connections, or both, connected by appropriate bridges, adapters, or controllers. In some examples, the interconnect 510 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 510 may allow data communication between the processor 512 and system memory 518, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 512 may control operations of the computer system 500. In some examples, the processor 512 may do so by executing instructions such as software or firmware stored in system memory 518 or other data via the storage adapter 520. In some examples, the processor 512 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 514 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 516 may provide the computer system 500 with an ability to communicate with a variety of remote devices over a network such as a communication network. The network interface 516 may include, for example, an Ethernet adapter, a Fibre Channel adapter, and/or other wired- or wireless-enabled adapter. The network interface 516 may provide a direct or indirect connection from one network element to another, and facilitate communication and between various network elements.

The storage adapter 520 may connect to a standard computer readable medium for storage and/or retrieval of information, such as a fixed disk drive (internal or external).

Other devices, components, elements, or subsystems (not illustrated) may be connected in a similar manner to the interconnect 510 or via a network such as a communication network. The devices and subsystems can be interconnected in different ways from that shown in FIG. 5. Instructions to implement various examples and implementations described herein may be stored in computer-readable storage media such as one or more of system memory 518 or other storage. Instructions to implement the present disclosure may also be received via one or more interfaces and stored in memory. The operating system provided on computer system 500 may be MS-DOS®, MS-WINDOWS®, OS/2®, OS X®, IOS®, ANDROID®, UNIX®, Linux®, or another operating system.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number.

The databases 151, 161 may each include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independently and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for interfacing between a point of sale (POS) device and a payment network through an application on a user device in order to facilitate an installment offer at a physical location of a merchant for a buy-now-pay later (BNPL) transaction, the system comprising:
   a user device programmed by the application to:
      scan a machine-readable code that encodes transaction data relating to a purchase at the POS device, the transaction data comprising a merchant identifier that identifies the merchant, an item identifier that identifies an item involved in the transaction, and a price of the item;
      decode the transaction data from the machine-readable code;
      transmit to the payment network, the decoded merchant identifier, the item identifier, and the price;
      receive, from the payment network, one or more installment offers, identified from among a plurality of installment offers, to finance the purchase of the item;
      present, for display a list of the one or more installment offers, wherein an indication of a selection of an installment offer is provided to the POS device, which initiates a BNPL transaction with the payment network;
      receive, from the payment network, an installment offer plan associated with the selected installment offer;
      transmit a confirmation of acceptance of the installment offer plan;
      receive, from the payment network, a BNPL identifier that is linked with a virtual card number (VCN) issued by a financial institution (FI) for paying the merchant for the BNPL transaction, the BNPL identifier being encoded in a second machine-readable code for display to pay for the BNPL transaction; and
      display the second machine-readable code that encodes the BNPL identifier for the POS device, wherein the POS device is to decode the BNPL identifier from the second machine-readable code and is to transmit the decoded BNPL to a payment server that identifies the VCN based on the BNPL identifier and initiates the BNPL transaction based on the VCN.

2. The system of claim 1, further comprising the POS device, wherein the POS device is programmed to:
   determine that the purchase includes the item that is eligible for the BNPL transaction and a second item that is not eligible for BNPL transactions;
   bifurcate the purchase into at least a first transaction for the item to be paid for based on the BNPL transaction and a second transaction for the second item that is not eligible for BNPL transactions and is to be paid separately from the BNPL transaction.

3. The system of claim 2, wherein the POS device is further programmed to:
   decode the machine-readable code to obtain the BNPL identifier; and
   transmit the BNPL identifier to the payment network to initiate the BNPL transaction.

4. The system of claim 2, wherein the POS device is further programmed to:
   generate the machine-readable code for display on a display device or print via a printer device.

5. The system of claim 2, wherein the machine-readable code is a QR code and/or a bar code.

6. The system of claim 1, wherein to provide the BNPL identifier, the user device is programmed to:
generate a second machine-readable code comprising the BNPL identifier.

7. The system of claim 1, further comprising:
a payment network server programmed to:
identify the one or more installment offers from a plurality of installment offers based on one or more offer ranking criteria.

8. The system of claim 7, wherein the ranking criteria is based on one or more terms of the installment offers.

9. The system of claim 7, wherein the payment network server is further programmed to:
receive, from the merchant, an identification of one or more items that are eligible for BNPL transactions.

10. The system of claim 9, wherein the payment network server is further programmed to:
store the item identifier of one or more items in an offers database, the offers database being queried when the application requests the item identifier.

11. A method for interfacing between a point of sale (POS) device and a payment network through an application on a user device in order to facilitate an installment offer at a physical location of a merchant for a buy-now-pay later (BNPL) transaction, the method comprising:
scanning, by the user device, a machine-readable code that encodes transaction data relating to a purchase at the POS device, the transaction data comprising a merchant identifier that identifies the merchant, an item identifier that identifies an item involved in the transaction, and a price of the item;
decoding, by the user device, the transaction data from the machine-readable code;
transmitting, by the user device, to the payment network, the decoded merchant identifier, the item identifier, and the price;
receiving, by the user device, from the payment network, one or more installment offers, identified from among a plurality of installment offers, to finance the purchase of the item;
presenting, by the user device, for display a list of the one or more installment offers, wherein an indication of a selection of an installment offer is provided to the POS device, which initiates a BNPL transaction with the payment network;
receiving, by the user device, from the payment network, an installment offer plan associated with the selected installment offer;
transmitting, by the user device, a confirmation of acceptance of the installment offer plan;
receiving, by the user device, from the payment network, a BNPL identifier that is linked with a virtual card number (VCN) issued by a financial institution (FI) for paying the merchant for the BNPL transaction, the BNPL identifier being encoded in a second machine-readable code for display to pay for the BNPL transaction; and
displaying, by the user device, the second machine-readable code that encodes the BNPL identifier to the POS device, wherein the POS device identifies the VCN based on the BNPL identifier and initiates the BNPL transaction based on the VCN.

12. The method of claim 11, further comprising:
determining, by the POS device, that the purchase includes the item that is eligible for the BNPL transaction and a second item that is not eligible for BNPL transactions;
bifurcating, by the POS device, the purchase into at least a first transaction for the item to be paid for based on the BNPL transaction and a second transaction for the second item that is not eligible for BNPL transactions and is to be paid separately from the BNPL transaction.

13. The method of claim 12, the method further comprising:
decoding, by the POS device, the machine-readable code to obtain the BNPL identifier; and
transmitting, by the POS device, the BNPL identifier to the payment network to initiate the BNPL transaction.

14. The method of claim 12, the method further comprising:
generating, by the POS device, the machine-readable code for display on a display device or print via a printer device.

15. The method of claim 12, wherein the machine-readable code is a QR code and/or a bar code.

16. The method of claim 11, wherein providing the BNPL comprises:
generating a second machine-readable code comprising the BNPL identifier.

17. The method of claim 11, the method further comprising:
identifying, by a payment network server, the one or more installment offers from a plurality of installment offers based on one or more offer ranking criteria.

18. The method of claim 17, wherein the ranking criteria is based on one or more terms of the installment offers.

19. The method of claim 17, the method further comprising:
receiving, by the payment network server, from the merchant, an identification of one or more items that are eligible for BNPL transactions.

20. A payment network server, comprising:
an installment offer database that stores:
a plurality of item identifiers that each identify items eligible for buy-now-pay-later (BNPL) transactions and each associated with a respective merchant identifier of a merchant;
a plurality of installment offers that each identifies financing terms to pay for a BNPL transaction and each associated with a respective financial institution (FI) identifier of a FI that provides a corresponding installment offer;
a processor programmed to:
receive, from a user device, a request for installment offers, the request comprising one or more item identifiers, a respective price for each of the one or more identifiers, and a merchant identifier;
identify an item identifier from among the one or more item identifiers that is eligible for BNPL transactions based on storage of the item identifier and the merchant identifier in the installment offers database;
identify one or more installment offers based on an installment offer amount to cover the price of an item identified by the item identifier;
transmit the one or more installment offers to the user device responsive to the request;
receive an indication that a buyer has selected an installment offer from among the one or more installment offers;

transmit an identification of the installment offer, an identification of the buyer, and the installment offer amount to a BNPL server of a FI associated with the installment offer, wherein the FI determines that the buyer is qualified for the installment offer;

receive, from the BNPL server, a virtual card number (VCN) and a BNPL identifier, and store the VCN and the BNPL in association with one another, wherein the BNPL identifier is encoded in a second machine-readable code for display to pay for the BNPL transaction;

transmit the second machine-readable code that encodes the BNPL identifier to the user device, wherein the user device displays the second machine-readable code that encodes the BNPL identifier to a point of sale (POS) device for purchasing the item using the installment offer, wherein the POS device is to decode the BNPL identifier from the second machine-readable code;

receive, from the POS device, the BNPL identifier;

access the VCN based on the BNPL identifier;

transmit an authorization request message to the BNPL server, the authorization request message comprising the installment offer and the VCN; and receive an approval response from the BNPL server and forward the approval response to the POS device to complete the payment authorization for the BNPL transaction.

\* \* \* \* \*